(12) United States Patent
Nakamura et al.

(10) Patent No.: US 8,552,109 B2
(45) Date of Patent: Oct. 8, 2013

(54) AQUEOUS POLYURETHANE RESIN DISPERSION, PREPARATION METHOD OF THE SAME, AND COATING COMPOSITION CONTAINING THE SAME

(75) Inventors: Taku Nakamura, Ube (JP); Masahiro Naiki, Ube (JP); Atsushi Morikami, Ube (JP); Fumio Adachi, Ube (JP); Manabu Takahashi, Ube (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 96 days.

(21) Appl. No.: 12/994,692

(22) PCT Filed: May 28, 2009

(86) PCT No.: PCT/JP2009/059735
§ 371 (c)(1),
(2), (4) Date: Nov. 24, 2010

(87) PCT Pub. No.: WO2009/145242
PCT Pub. Date: Dec. 3, 2009

(65) Prior Publication Data
US 2011/0077352 A1  Mar. 31, 2011

(30) Foreign Application Priority Data
May 29, 2008  (JP) ................................. 2008-140474

(51) Int. Cl.
  *C08G 18/08* (2006.01)
  *C08G 18/28* (2006.01)
  *C08J 3/00* (2006.01)
  *C08K 3/20* (2006.01)
  *C08L 75/00* (2006.01)

(52) U.S. Cl.
USPC ........... 524/591; 524/589; 524/590; 524/839; 524/540

(58) Field of Classification Search
USPC .......................... 524/589, 590, 591, 839, 840
See application file for complete search history.

(56) References Cited

U.S. PATENT DOCUMENTS

| | | |
|---|---|---|
| 4,024,113 A | 5/1977 | Ammons |
| 4,103,070 A | 7/1978 | Ammons |
| 4,895,894 A | 1/1990 | Ruetman et al. |
| 4,956,438 A | 9/1990 | Ruetman et al. |
| 5,043,381 A | 8/1991 | Coogan et al. |
| 5,124,424 A | 6/1992 | Endo et al. |
| 5,141,987 A | 8/1992 | Nachtkamp et al. |
| 5,143,997 A | 9/1992 | Endo et al. |
| 5,169,895 A | 12/1992 | Coogan et al. |
| 5,693,703 A | 12/1997 | Hart |
| 5,738,912 A | 4/1998 | Konig et al. |
| 5,859,122 A | 1/1999 | Umeya |
| 6,096,805 A | 8/2000 | Lange et al. |
| 6,433,072 B1 | 8/2002 | Gobel et al. |
| 7,511,082 B2 | 3/2009 | Nakamura et al. |
| 7,728,076 B2 | 6/2010 | Wamprecht et al. |
| 2002/0156145 A1 | 10/2002 | Van Den Berg et al. |
| 2004/0077779 A1 | 4/2004 | Schafheutle et al. |
| 2004/0259970 A1 | 12/2004 | Lockhart et al. |
| 2005/0003102 A1 | 1/2005 | Lockhart et al. |
| 2006/0240264 A1 | 10/2006 | Gertzmann et al. |
| 2007/0083002 A1 | 4/2007 | Schafheutle et al. |
| 2007/0155933 A1 | 7/2007 | Watanabe et al. |
| 2008/0103282 A1 | 5/2008 | Nagamatsu et al. |
| 2008/0146767 A1 | 6/2008 | Wamprecht et al. |
| 2008/0188625 A1 | 8/2008 | Uchida et al. |
| 2008/0194775 A1 | 8/2008 | Blum et al. |
| 2009/0012201 A1 | 1/2009 | Kim et al. |
| 2009/0118422 A1 | 5/2009 | Uchida et al. |
| 2010/0222448 A1 | 9/2010 | Ziegler et al. |
| 2011/0112245 A1 | 5/2011 | Nakamura et al. |
| 2011/0168603 A1 | 7/2011 | Pettersson |
| 2011/0313101 A1 | 12/2011 | Morikami et al. |

FOREIGN PATENT DOCUMENTS

| | | |
|---|---|---|
| EP | 0 616 007 A1 | 9/1994 |
| EP | 0 665 563 A1 | 8/1995 |
| EP | 2 281 848 A1 | 2/2011 |
| GB | 2 425 771 A | 11/2006 |
| JP | 52-132096 A | 11/1977 |
| JP | 10-72520 A | 3/1989 |
| JP | 1-104612 A | 4/1989 |
| JP | 2-289616 A | 11/1990 |

(Continued)

OTHER PUBLICATIONS

Machine English translation of JP 06-248046, Yamamori et al., Sep. 1994.*
International Search Report, dated Sep. 15, 2009, issued in PCT/JP2009/059735.
U.S. Appl. No. 13/003,512, filed Jan. 10, 2011.
U.S. Appl. No. 13/054,391, filed Jan. 14, 2011.
U.S. Appl. No. 13/203,454, filed Aug. 25, 2011.
U.S. Appl. No. 13/203,450, filed Aug. 25, 2011.
U.S. Appl. No. 13/203,247, filed Aug. 25, 2011.
U.S. Appl. No. 13/386,308, filed Jan. 20, 2012.
U.S. Appl. No. 13/391,188, filed Feb. 17, 2012.
U.S. Appl. No. 13/508,934, filed May 9, 2012.
Final Ofice Action for related U.S. Appl. No. 13/203,450, dated Feb. 8, 2013.
Final Office Action for related U.S. Appl. No. 13/203,247, dated Feb. 20, 2013.
Non-Final Office Action for related U.S. Appl. No. 13/508,934, dated Mar. 28, 2013.
Supplementary European Search Report for European Patent Application No. 09794396.3, dated Dec. 5, 2012.

(Continued)

*Primary Examiner* — Patrick Niland
(74) *Attorney, Agent, or Firm* — Birch, Stewart, Kolasch & Birch, LLP

(57) ABSTRACT

Disclosed is an aqueous polyurethane resin dispersion which comprises a polyurethane resin which is obtained by reacting (A) a polyurethane prepolymer obtained by reacting (a) a polycarbonate polyol having an alicyclic structure in the main chain, (b) an acidic group-containing polyol compound and (d) a polyisocyanate, and (B) a chain-elongating agent, being dispersed in an aqueous medium, a carboxylic acid group content of the above-mentioned (A) polyurethane prepolymer based on a solid component of (A) the polyurethane prepolymer is 2.0 to 13.0% by weight, and a number of a hydroxyl equivalent of a mixture of the above-mentioned (a) polycarbonate polyol having an alicyclic structure in the main chain, the above-mentioned (b) acidic group-containing polyol compound, and, if necessary, (c) a polyol other than (a) and (b) is 70 to 270.

14 Claims, No Drawings

(56) References Cited

FOREIGN PATENT DOCUMENTS

| | | | |
|---|---|---|---|
| JP | 2-306427 A | 12/1990 |
| JP | 3-128912 A | 5/1991 |
| JP | 3-140318 A | 6/1991 |
| JP | 3-174429 A | 7/1991 |
| JP | 3-220233 A | 9/1991 |
| JP | 4-41517 A | 2/1992 |
| JP | 4-503226 A | 6/1992 |
| JP | 5-9434 A | 1/1993 |
| JP | 5-39340 A | 2/1993 |
| JP | 6-200149 A | 7/1994 |
| JP | 6-248046 A | 9/1994 |
| JP | 7-41539 A | 2/1995 |
| JP | 8-193181 A | 7/1996 |
| JP | 10-120757 A | 5/1998 |
| JP | 10-130354 A | 5/1998 |
| JP | 10-273514 A | 10/1998 |
| JP | 11-152321 A | 6/1999 |
| JP | 2000-212240 A | 8/2000 |
| JP | 2001-334615 A | 12/2001 |
| JP | 2002-128851 A | 5/2002 |
| JP | 2002-179758 A | 6/2002 |
| JP | 2002-179787 A | 6/2002 |
| JP | 2003-342335 A | 12/2003 |
| JP | 2005-8888 A | 1/2005 |
| JP | 2005-60643 A | 3/2005 |
| JP | 2005-113318 A | 4/2005 |
| JP | 2005-220255 A | 8/2005 |
| JP | 2005-232447 A | 9/2005 |
| JP | 2005-281544 A | 10/2005 |
| JP | 2006-206774 A | 8/2006 |
| JP | 2006-307215 A | 11/2006 |
| JP | 2006-335951 A | 12/2006 |
| JP | 2007-39673 A | 2/2007 |
| JP | 2007-119749 A | 5/2007 |
| JP | 2007-245369 A | 9/2007 |
| JP | 2008-37987 A | 2/2008 |
| JP | 2008-56760 A | 3/2008 |
| JP | 2008-150590 A | 7/2008 |
| JP | 2008-534710 A | 8/2008 |
| JP | 2008-248014 A | 10/2008 |
| JP | 2008-303284 A | 12/2008 |
| JP | 2008-303285 A | 12/2008 |
| JP | 2009-523188 A | 6/2009 |
| JP | 2010-215885 A | 9/2010 |
| JP | 2010-222554 A | 10/2010 |
| WO | WO 2006/093355 A1 | 9/2006 |
| WO | WO 2006/101433 A | 9/2006 |
| WO | WO 2007/005808 A2 | 1/2007 |
| WO | WO 2008/078754 A1 | 7/2008 |
| WO | WO 2010/004951 A1 | 1/2010 |
| WO | WO 2010-098316 A1 | 9/2010 |

OTHER PUBLICATIONS

Extended European Search Report dated Jun. 21, 2011 for European Patent Application No. 09797804.3.
International Preliminary Report on Patentability and English translation of the Written Opinion of the International Searching Authority (Forms PCT/IB/338, PCT/IB/373 and PCT/ISA/237) dated Feb. 17, 2011 for International Application No. PCT/JP2009/061892.
International Preliminary Report on Patentability and English translation of the Written Opinion of the International Searching Authority (Forms PCT/IB/338, PCT/IB/373 and PCT/ISA/237) dated Feb. 17, 2011 for International Application No. PCT/JP2009/062276.
International Preliminary Report on Patentability and English Translation of the Written Opinion of the International Searching Authority (Forms PCT/IB/338, PCT/IB/373 and PCT/ISA/237) dated on Mar. 22, 2012 for International Application No. PCT/JP2010/063087.
International Preliminary Report on Patentability and English translation of the Written Opinion of the International Searching Authority (Forms PCT/IB/338, PCT/IB/373 and PCT/ISA/237), dated Sep. 22, 2011, for International Application No. PCT/JP2010/052757.
International Preliminary Report on Patentability and English translation of the Written Opinion of the International Searching Authority (Forms PCT/IB/338, PCT/IB/373 and PCT/ISA/237), dated Sep. 22, 2011, for International Application No. PCT/JP2010/052758.
International Preliminary Report on Patentability and English translation of the Written Opinion of the International Searching Authority (Forms PCT/IB/338, PCT/IB/373 and PCT/ISA/237), dated Sep. 22, 2011, for International Application No. PCT/JP2010/052759.
International Preliminary Report on Patentability, and English translation of the Written Opinion of the International Searching Authority (Forms PCT/IB/338, PCT/IB/373 and PCT/ISA/237), dated Jun. 21, 2012, for International Application No. PCT/JP2010/069789.
International Preliminary Report on Patentability, and English translation of Written Opinion of the International Searching Authority (Forms PCT/IB/338, PCT/IB/373 and PCT/ISA/237), dated Feb. 16, 2012, for International Application No. PCT/JP2010/062419.
International Search Report for PCT/JP2009/061892 dated Jul. 28, 2009.
International Search Report for PCT/JP2010/052757 dated May 25, 2010.
International Search Report for PCT/JP2010/062419 dated Nov. 9, 2010.
International Search Report for PCT/JP2010/063087, dated on Nov. 16, 2010.
International Search Report for PCT/JP2010/069789 dated Feb. 22, 2011.
International Search Report, dated Jun. 1, 2010, for Application No. PCT/JP2010/052758.
International Search Report, dated Jun. 1, 2010, for Application No. PCT/JP2010/052759.
International Search Report, dated Oct. 13, 2009, for Application No. PCT/JP2009/062276.
Matsunaga, "Latest Polyurethane Material and Applied Technique—Road to Polyurethane Production", The Comprehensive Materials and Technology for a Novel Polyurethane Production, CMC Publishing Co., Ltd., Chapter 2, pp. 43, Sep. 30, 2005.
Odian, "Principles of Polymerization", John Wiley & Sons, Inc., Third Edition, 7 pages, 1991.
Supplementary European Search Report for European Patent Application No. 10746197.2, dated Jul. 20, 2012.
U.S. Office Action, dated Jul. 24, 2012, for U.S. Appl. No. 13/203,247.
U.S. Office Action, dated Jul. 24, 2012, for U.S. Appl. No. 13/203,454.
U.S. Office Action, dated Jun. 27, 2012, for U.S. Appl. No. 13/203,450.
U.S. Office Action, dated Nov. 8, 2012, for U.S. Appl. No. 13/203,454.
U.S. Office Action, dated Oct. 17, 2012, for U.S. Appl. No. 13/003,512.
Non-Final Office Action for related U.S. Appl. No. 13/386,308, dated Dec. 26, 2012.
Office Action for U.S. Appl. No. 13/003,512, dated Jun. 4, 2013.
Office Action for U.S. Appl. No. 13/203,454, dated May 30, 2013.
Non-Final Office Action for related U.S. Appl. No. 13/203,450, dated Aug. 8, 2013.

* cited by examiner

AQUEOUS POLYURETHANE RESIN DISPERSION, PREPARATION METHOD OF THE SAME, AND COATING COMPOSITION CONTAINING THE SAME

TECHNICAL FIELD

The present invention relates to an aqueous polyurethane resin dispersion in which a polyurethane resin is dispersed in an aqueous medium, a process for preparing the same, and a coating composition containing the same.

BACKGROUND ART

A polycarbonate polyol is a useful compound as a starting material for preparing a polyurethane resin which is used for preparing a hard foam, a soft foam, a paint, an adhesive, artificial leather, ink binder etc., by the reaction with an isocyanate compound.

Also, it has been known that a coating film obtained by coating an aqueous polyurethane resin dispersion containing a polycarbonate polyol as a starting material is excellent in light resistance, heat resistance, hydrolysis resistance and oil resistance (see Patent Literature 1). However, when a material comprising an aliphatic polyol is used as a polycarbonate polyol, there are problems that hardness of the coating film obtained from an aqueous polyurethane resin dispersion is insufficient, for example, in the field of a paint or in the field of a coating agent for an outer board for an airplane, automobile, etc., and for an outer wall surface and floor material, etc., of a house.

Thus, to improve the hardness of the coating film, it has generally been proposed to use an aqueous polyurethane resin dispersion which employs a polyol having an alicyclic structure. However, when the polyol having an alicyclic structure is used as a starting material, dispersibility into an aqueous medium becomes worse, and there are problems in handling property and stability of the aqueous polyurethane resin dispersion.

There is disclosed an example of an aqueous polyurethane resin dispersion using a polyol actually having an alicyclic structure (see Patent Literature 2), but an effect on hardness of the coating film obtained by coating the aqueous polyurethane resin dispersion is unknown, and dispersibility thereof in an aqueous medium is not satisfied.

PRIOR ART REFERENCES

Patent Literatures

[Patent Literature 1] JP H10-120757A
[Patent Literature 2] JP H06-248046A

DISCLOSURE OF THE INVENTION

Problems to be Solved by the Invention

An object of the present invention is to obtain an aqueous polyurethane resin dispersion which has good dispersibility in an aqueous medium, and excellent in strength of a coated film obtained by coating and drying.

Means to Solve the Problems

The present inventors have carried out various investigations to solve the above-mentioned problems involved in the prior art, and as a result, they have found that an aqueous polyurethane resin dispersion which has good dispersibility in an aqueous medium, is excellent in stability in water, and further is useful for a coating agent or a coating composition having good hydrolysis resistance, durability, heat resistance and wear resistance, particularly excellent in hardness can be obtained by using a polycarbonate polyol having an alicyclic structure in the main chain and an acidic group-containing polyol compound in combination with a specific amount of a hydroxyl equivalent, reacting these with a polyisocyanate to give a polyurethane prepolymer having specific amounts of a carboxylic acid group content and a hydroxyl equivalent, and by using the polyurethane prepolymer.

The present invention is more specifically as follows.

[1] An aqueous polyurethane resin dispersion which comprises
a polyurethane resin obtained by reacting (A) a polyurethane prepolymer which is obtained by reacting (a) a polycarbonate polyol having an alicyclic structure in the main chain, (b) an acidic group-containing polyol compound and (d) a polyisocyanate, with (B) a chain-elongating agent, being dispersed in an aqueous medium, a carboxylic acid group content of the above-mentioned (A) polyurethane prepolymer is 2.0 to 13.0% by weight, and
a number of a hydroxyl equivalent of a mixture of the above-mentioned (a) polycarbonate polyol having an alicyclic structure in the main chain and (b) the above-mentioned acidic group-containing polyol compound is 70 to 270.

[2] An aqueous polyurethane resin dispersion which comprises
a polyurethane resin which is obtained by reacting (A) a polyurethane prepolymer obtained by reacting (a) a polycarbonate polyol having an alicyclic structure in the main chain, (b) an acidic group-containing polyol compound, (c) a polyol other than (a) and (b), and (d) a polyisocyanate, and (B) a chain-elongating agent, being dispersed in an aqueous medium,
a carboxylic acid group content of the above-mentioned (A) polyurethane prepolymer is 2.0 to 13.0% by weight, and
a number of a hydroxyl equivalent of the mixture of the above-mentioned (a) polycarbonate polyol having an alicyclic structure in the main chain, (b) the above-mentioned acidic group-containing polyol compound and the above-mentioned (c) polyol other than (a) and (b) is 70 to 270.

[3] A coating composition which contains the aqueous polyurethane resin dispersion described in the above-mentioned [1].

[4] A coating composition which contains the aqueous polyurethane resin dispersion described in the above-mentioned [2].

[5] A process for preparing the aqueous polyurethane resin dispersion described in the above-mentioned [1], which comprises the steps of:

Step ($\alpha1$) of obtaining (A) a polyurethane prepolymer by reacting (a) a polycarbonate polyol having an alicyclic structure in the main chain, (b) an acidic group-containing polyol compound, and (d) a polyisocyanate, Step ($\beta$) of neutralizing an acidic group of the above-mentioned (A) polyurethane prepolymer, Step ($\gamma$) of dispersing the above-mentioned (A) polyurethane prepolymer into an aqueous medium, and Step ($\delta$) of obtaining a polyurethane resin by reacting the above-mentioned (A) polyurethane prepolymer, and (B) a chain-elongating agent having a reactivity with an isocyanate group of the above-mentioned (A) polyurethane prepolymer.

[6] A process for preparing the aqueous polyurethane resin dispersion described in the above-mentioned [2], which comprises the steps of:

Step (α2) of obtaining (A) a polyurethane prepolymer by reacting (a) a polycarbonate polyol having an alicyclic structure in the main chain, (b) an acidic group-containing polyol compound, (c) a polyol other than (a) and (b), and (d) a polyisocyanate, Step (β) of neutralizing an acidic group of the above-mentioned (A) polyurethane prepolymer, Step (γ) of dispersing the above-mentioned (A) polyurethane prepolymer into an aqueous medium, and Step (δ) of obtaining a polyurethane resin by reacting the above-mentioned (A) polyurethane prepolymer, and (B) a chain-elongating agent having a reactivity with an isocyanate group of the above-mentioned (A) polyurethane prepolymer.

Effects of the Invention

In the aqueous polyurethane resin dispersion of the present invention, it is excellent in dispersion stability in water, and a coating film thereof has a hydrolysis resistance, durability, heat resistance and wear resistance, and particularly excellent in hardness. Therefore, the aqueous polyurethane resin dispersion of the present invention is useful as a starting material for a coating agent and a composition for a paint. Also, according to the process for preparing the aqueous polyurethane resin dispersion of the present invention, an aqueous polyurethane resin dispersion useful as a starting material of a coating agent and a composition for a paint each having a hydrolysis resistance, durability, heat resistance and wear resistance, and particularly excellent in hardness can be obtained.

EMBODIMENT TO CARRY OUT THE INVENTION ((a) Polycarbonate Polyol Having an Alicyclic Structure in the Main Chain)

(a) The polycarbonate polyol having an alicyclic structure in the main chain (in the following, it is sometimes referred to as "(a) polycarbonate polyol".) to be used in the present invention preferably has a number average molecular weight of 400 to 4000. If the above-mentioned number average molecular weight is less than 400, it is inferior in characteristics as a soft segment, and there is a tendency of easily causing cracks when a coating film is formed by using the resulting aqueous polyurethane resin dispersion. If the above-mentioned number average molecular weight exceeds 4000, reactivity of (a) the polycarbonate polyol and (d) the isocyanate compound lowers, so that there is a case where the preparation step of the polyurethane prepolymer takes many hours, a case where the reaction does not proceed sufficiently, or a case where the viscosity of (a) the polycarbonate polyol is high, and handling of the product becomes difficult in some cases. It is more preferred that (a) the polycarbonate polyol has a number average molecular weight of 400 to 3000.

In the present invention, the number average molecular weight is a value measured by the following method.

The number average molecular weight of the polycarbonate polyol of the present invention is a number average molecular weight each calculated based on the hydroxyl group value measured according to JIS K 1577.

The above-mentioned (a) polycarbonate polyol has an alicyclic structure in the main chain. By having an alicyclic structure in the main chain, elasticity of the coating film which uses (a) the polycarbonate polyol as a starting material is increased, to develop excellent hardness.

The above-mentioned (a) polycarbonate polyol is not particularly limited so long as it satisfies the requirement regulated as mentioned above, and, for example, there may be mentioned a polycarbonate polyol obtained by reacting a polyol having an alicyclic structure in the main chain and a carbonate compound, a polycarbonate polyol obtained by reacting a polyol having an alicyclic structure in the main chain, a polyol other than the polyol, and a carbonate compound, etc. Of these, in view of dispersibility of the resulting aqueous polyurethane resin dispersion, a polycarbonate polyol obtained by reacting a polyol compound having an alicyclic structure in the main chain, a polyol other than the polyol and a carbonate compound is preferred.

The above-mentioned polyol having an alicyclic structure in the main chain is not particularly limited, and there may be mentioned, for example, a polyol having an alicyclic group having 5 to 12 carbon atoms in the main chain, etc. More specifically, there may be mentioned diols having an alicyclic structure in the main chain such as 1,4-cyclohexane dimethanol, 1,3-cyclohexane dimethanol, 1,4-cyclohexane diol, 1,3-cyclopentane diol, 1,4-cycloheptane diol, 2,5-bis(hydroxymethyl)-1,4-dioxane, 2,7-norbornane diol, tetrahydrofuran dimethanol, 1,4-bis(hydroxyethoxy)cyclohexane, etc., and of these, 1,4-cyclohexane dimethanol is preferred in view of easiness in obtaining the material.

Moreover, as the starting material for the above-mentioned (a) polycarbonate polyol, a polyol other than the polyol having an alicyclic structure in the main chain may be used. Such a polyol may be mentioned, for example, an aliphatic diol having 3 to 12 carbon atoms such as 1,6-hexanediol, 1,5-pentanediol, 2-ethyl-1,6-hexanediol, 1,4-butanediol, 1,9-nonanediol, 3-methyl-1,5-pentanediol, 2-methyl-1,8-octanediol, etc., and diethylene glycol, triethylene glycol, tetraethylene glycol, etc.

The above-mentioned carbonate compound is not particularly limited, and there may be mentioned, for example, an aliphatic carbonate compound such as dimethyl carbonate, diethyl carbonate, etc., an aromatic carbonate compound such as diphenyl carbonate, etc., a cyclic carbonate compound such as ethylene carbonate, etc. and the like. In addition, a phosgene, etc. which can produce a polycarbonate polyol may be used. Of these, due to easiness in preparing the above-mentioned polycarbonate polyol, an aliphatic carbonate compound is preferred, and dimethyl carbonate is particularly preferred.

As a method for preparing the polycarbonate polyol from the above-mentioned polyol and carbonate compound, there may be mentioned, for example, a method in which a carbonate compound and a polyol with an excessive molar number than the molar number of the carbonate compound are charged in a reactor, reacted at a temperature of 160 to 200° C. and a pressure of 50 mmHg or so for 5 to 6 hours, and further reacted at a pressure of several mmHg or less and at 200 to 220° C. for several hours. In the above-mentioned reaction, it is preferred to carry out the reaction while removing the by-producing alcohol out of the reaction system. At that time, when the carbonate compound is removed with the by-producing alcohol out of the reaction system by azeotropic distillation, an excessive amount of the carbonate compound may be added. Also, in the above-mentioned reaction, a catalyst such as titanium tetrabutoxide, etc., may be used.

A method for preparing (a) the polycarbonate polyol is not particularly limited, and there may be mentioned, for example, a preparation method in which a polyol having an alicyclic structure in the main chain and a carbonate compound are subjected to transesterification reaction, a preparation method in which a polyol having an alicyclic structure in the main chain, a polyol other than the above and a carbonate compound are subjected to transesterification reaction, a preparation method in which a polycarbonate polyol obtained by subjecting a polyol other than the polyol having an alicyclic structure in the main chain and a carbonate compound to transesterification reaction, and a polyol having an alicyclic structure in the main chain are subjected to transesterification reaction, a preparation method in which a polycarbonate polyol obtained by subjecting a polyol having an alicyclic structure in the main chain and a carbonate compound to transesterification reaction, and a polyol other than the polyol having an alicyclic structure in the main chain are subjected to transesterification reaction, a preparation method in which two kinds of polycarbonate polyols one of which is a polycarbonate polyol obtained by subjecting a polyol having an alicyclic structure in the main chain and a carbonate compound to transesterification reaction, and the other is a polycarbonate polyol obtained by subjecting a polyol other than the polyol having an alicyclic structure in the main chain and a carbonate compound to transesterification reaction are subjected to transesterification reaction, etc.

((b) Acidic Group-Containing Polyol Compound)

The above-mentioned (b) acidic group-containing polyol compound contains 2 or more hydroxyl groups and 1 or more acidic groups in one molecule. As the acidic group, there may be mentioned a carboxyl group, sulfonic acid group, phosphorous acid group, phenolic hydroxyl group, etc. In particular, as the above-mentioned (b) acidic group-containing polyol compound, a compound containing 2 hydroxyl groups and 1 carboxyl group in one molecule is preferred. The above-mentioned (b) acidic group-containing polyol compound may be used one kind alone, or may be used two or more kinds in combination.

As the above-mentioned (b) acidic group-containing polyol compound, there may be more specifically mentioned a dimethylol alkanoic acid such as 2,2-dimethylol propionic acid, 2,2-dimethylol butanoic acid, etc.; N,N-bishydroxyethyl glycine, N,N-bishydroxyethyl alanine, 3,4-dihydroxybutanesulfonic acid, 3,6-dihydroxy-2-toluene-sulfonic acid, etc. Of these, in view of easiness in obtaining the product, an alkanoic acid (dimethylol alkanoic acid) containing 2 methylol groups and a carbon number of 4 to 12 is preferred, and among the dimethylol alkanoic acids, 2,2-dimethylol propionic acid is more preferred.

((c) Polyol Other than (a) and (b))

As the above-mentioned (c) polyol, there may be used, for example, a high molecular weight diol or a low molecular weight diol.

The above-mentioned high molecular weight diol is not particularly limited, and there may be used those having a number average molecular weight of 400 to 4000, and, for example, a polycarbonate diol, polyester diol, polyether diol, acryl diol etc. As the above-mentioned polycarbonate diol, it is not particularly limited, and there may be more specifically mentioned a polytetramethylene carbonate diol, polyhexamethylene carbonate diol, etc. The above-mentioned polyester diol is not particularly limited, and there may be more specifically mentioned a polyethylene adipate diol, polybutyleneadipate diol, polyethylenebutylene adipate diol, polyhexamethylene isophthalate adipate diol, polyethylenesuccinate diol, polybutylenesuccinate diol, polyethylenesebacate diol, polybutylenesebacate diol, poly-$\epsilon$-caprolactone diol, poly(3-methyl-1,5-pentylene adipate) diol, a polycondensate of 1,6-hexane diol and a dimeric acid, etc. The above-mentioned polyether diol is not particularly limited, and there may be more specifically mentioned a polyethylene glycol, polypropylene glycol, polytetramethylene glycol, a random copolymer or block copolymer of ethylene oxide and propylene oxide, ethylene oxide and butylene oxide, etc. Further, a polyether polyester polyol having an ether bond(s) and an ester bond(s), etc., may be used. As the above-mentioned acrylic diol, there may be mentioned, for example, a (meth) acrylic series diol obtained by copolymerizing a hydroxyl group-containing (meth)acrylic acid series monomer(s), and other (meth)acrylic acid series monomer(s) copolymerizable with the same and/or other unsaturated monomer(s), etc.

The above-mentioned low molecular weight diol is not particularly limited, and there may be mentioned, those having a number average molecular weight of 60 or more and less than 400, for example, an aliphatic diol having a carbon number of 2 to 9 such as ethylene glycol, 1,3-propane diol, 2-methyl-1,3-propane diol, 2,2-dimethyl-1,3-propane diol, 2-butyl-2-ethyl-1,3-propane diol, 1,4-butane diol, 1,5-pentane diol, 3-methyl-1,5-pentane diol, 1,6-hexane diol, nane diol, 2-methyl-1,8-octane diol, diethylene glycol, triethylene glycol, tetraethylene glycol, etc.; and a diol having an alicyclic structure with a carbon number of 6 to 12 such as 1,4-cyclohexane dimethanol, 1,3-cyclohexane dimethanol, 1,4-cyclohexane diol, 1,4-bis(hydroxyethyl)cyclohexane, 2,7-norbornane diol, tetrahydrofuran dimethanol, 2,5-bis (hydroxymethyl)-1,4-dioxane, etc. Moreover, as the above-mentioned low molecular weight diol, a low molecular weight polyvalent alcohol such as trimethylolpropane, pentaerythritol, sorbitol, etc., may be used.

The above-mentioned (c) polyol may be used one kind alone, or may be used two or more kinds in combination.

In the present invention, the number of the hydroxyl equivalent of a mixture of the above-mentioned (a) polycarbonate polyol having an alicyclic structure in the main chain and the above-mentioned (b) acidic group-containing polyol compound is 70 to 270. Also, in the present invention, the number of the hydroxyl equivalent of the mixture of the above-mentioned (a) polycarbonate polyol having an alicyclic structure in the main chain, the above-mentioned (b) acidic group-containing polyol compound and (c) the polyol other than (a) and (b) is 70 to 270. If the number of the above-mentioned hydroxyl equivalent is less than 70, it is substantially difficult to prepare an aqueous polyurethane resin dispersion, while if it exceeds 270, there is a problem that hardness of the coated film obtained by coating the resulting aqueous polyurethane resin dispersion is too low.

As the number of the above-mentioned hydroxyl equivalent, in view of hardness of the coated film obtained by coating the resulting aqueous polyurethane resin dispersion, it is preferably 130 to 270, more preferably 160 to 260, and particularly preferably 180 to 260.

The number of the hydroxyl equivalent can be calculated from the following equations (1) and (2).

Number of hydroxyl equivalent of each polyol=Molecular weight of each polyol/Number of hydroxyl groups of each polyol  (1)

Number of the hydroxyl equivalent of the mixture of polyols=$M$/Total molar number of polyol  (2)

In the above-mentioned equation (2), M represents [[number of hydroxyl equivalent of (a) the polycarbonate polyolxmolar number of (a) the polycarbonate polyol]+[number of hydroxyl equivalent of (b) the acidic group-containing polyol compoundxmolar number of (b) the acidic group-containing polyol compound]+[number of hydroxyl equivalent of (c) the polyol other than (a) and (b)xmolar number of (c) the polyol other than (a) and (b)]].

((d) Polyisocyanate Compound)

(d) The polyisocyanate compound which can be used in the present invention is not particularly limited, and there may be mentioned an aromatic polyisocyanate compound having 2 or more isocyanate groups and having a carbon number of 6 to 20 (carbon in the NCO group is excluded, hereinafter the same), an aliphatic polyisocyanate compound having a carbon number of 2 to 18, an alicyclic polyisocyanate compound having a carbon number of 4 to 15, etc.

As the aromatic polyisocyanate compound, there may be more specifically mentioned 1,3-phenylene diisocyanate, 1,4-phenylene diisocyanate, 2,4-tolylene diisocyanate (TDI), 2,6-tolylene diisocyanate, 4,4'-diphenylmethane diisocyanate (MDI), 2,4-diphenylmethane diisocyanate, 4,4'-diisocyanatebiphenyl, 3,3'-dimethyl-4,4'-diisocyanatebiphenyl, 3,3'-dimethyl-4,4'-diisocyanatediphenylmethane, 1,5-naphthylene diisocyanate, 4,4',4"-triphenylmethane triisocyanate, m-isocyanate-phenylsulfonyl isocyanate, p-isocyanatephenylsulfonyl isocyanate, etc.

As the aliphatic polyisocyanate compound, there may be more specifically mentioned ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatemethyl caproate, bis(2-isocyanatoethyl)fumarate, bis(2-isocyanatoethyl)carbonate, 2-isocyanato ethyl-2,6-diisocyanatehexanoate, etc.

As the alicyclic polyisocyanate compound, there may be more specifically mentioned isophorone diisocyanate (IPDI), 4,4'-dicyclohexylmethane diisocyanate (hydrogen-added MDI), cyclohexylene diisocyanate, methyl cyclohexylene diisocyanate (hydrogen-added TDI), bis(2-isocyanateethyl)-4-dicyclohexene-1,2-dicarboxylate, 2,5-norbornane diisocyanate, 2,6-norbornane diisocyanate, etc.

These polyisocyanate compounds may be used one kind alone, or may be used two or more kinds in combination.

A number of the isocyanate group per one molecule of the above-mentioned polyisocyanate compound is generally 2, and a polyisocyanate having 3 or more isocyanate groups such as triphenylmethane triisocyanate may be used in the range that the polyurethane resin of the present invention is not gelled.

Of the above-mentioned polyisocyanate compound, in view of controlling reactivity and providing elasticity, etc., 4,4'-diphenylmethane diisocyanate (MDI), isophorone diisocyanate (IPDI), and 4,4'-dicyclohexylmethane diisocyanate (hydrogen-added MDI) are preferred.

((A) Polyurethane Prepolymer)

(A) The polyurethane prepolymer which can be used in the present invention is a material obtained by reacting at least the above-mentioned (a) polycarbonate polyol having an alicyclic structure in the main chain, the above-mentioned (b) acidic group-containing polyol compound, and the above-mentioned (d) polyisocyanate compound. The above-mentioned (A) polyurethane prepolymer may be a material obtained by reacting the above-mentioned (a) polycarbonate polyol having an alicyclic structure in the main chain, the above-mentioned (b) acidic group-containing polyol compound, (c) the polyol other than (a) and (b), and the above-mentioned (d) polyisocyanate compound.

For preparing the above-mentioned (A) polyurethane prepolymer, when the total weight of the above-mentioned (a) polycarbonate polyol, the above-mentioned (b) acidic group-containing polyol compound and (c) the polyol other than (a) and (b) is made 100 parts by weight, then, a ratio of the above-mentioned (a) polycarbonate polyol is preferably 60 to 95 parts by weight, more preferably 65 to 90 parts by weight, and particularly preferably 75 to 90 parts by weight, a ratio of the above-mentioned (b) acidic group-containing polyol compound is preferably 5 to 40 parts by weight, more preferably 10 to 30 parts by weight, and particularly preferably 10 to 25 parts by weight, and a ratio of the above-mentioned (c) polyol other than (a) and (b) is preferably 0 to 30 parts by weight, more preferably 0 to 10 parts by weight, and particularly preferably 0 to 5 parts by weight.

If the ratio of the above-mentioned (a) polycarbonate polyol is too little, hardness of the coating film obtained by coating the resulting aqueous polyurethane resin dispersion tends to be low, while if it is too much, there is a case where the resulting coating film becomes too hard.

If the ratio of the above-mentioned (b) acidic group-containing polyol compound is too little, there is a tendency of worsening dispersibility of the resulting aqueous polyurethane resin in an aqueous medium, while if it is too much, there is a tendency of worsening water resistance of the coating film obtained by coating the resulting aqueous polyurethane resin dispersion.

If the ratio of the above-mentioned (c) polyol other than (a) and (b) is too much, then, the ratio of the above-mentioned (a) polycarbonate polyol in the whole polyol component relatively becomes too little, or the ratio of the above-mentioned (b) acidic group-containing polyol compound becomes too little, so that there are cases where hardness of the coating film is low, or dispersibility of the aqueous polyurethane resin becomes worse.

A molar number of the isocyanate group of the above-mentioned (d) polyisocyanate compound based on a molar number of the whole hydroxyl group of the polyol component comprising the above-mentioned (a) polycarbonate polyol and the above-mentioned (b) acidic group-containing polyol compound, or the polyol component comprising the above-mentioned (a) polycarbonate polyol, the above-mentioned (b) acidic group-containing polyol compound and (c) the polyol other than (a) and (b) is preferably 1.01 to 2.5. If the molar number of the hydroxyl group of the above-mentioned polyol component is too much, an amount of (A) the polyurethane prepolymer having no isocyanate group at the molecule end becomes much, i.e., an amount of the molecule which does not react with (B) the chain-elongating agent becomes much, so that there is a problem that strength of the coating film obtained by coating the aqueous polyurethane resin dispersion of the present invention is lowered. Also, if the molar number of the hydroxyl group of the polyol component is too little, much amount of (d) the unreacted above-mentioned polyisocyanate compound remains in the reaction system, and it reacts with the above-mentioned chain-elongating agent or water to cause molecular elongation, whereby there is a problem that unevenness occurs on the surface of the coating film obtained by coating the aqueous polyurethane resin dispersion of the present invention. A ratio of the molar number of the isocyanate group of the above-mentioned (d) polyisocyanate compound based on the molar number of the whole hydroxyl group of the polyol component is preferably 1.2 to 2.2, and particularly preferably 1.2 to 2.0.

When the above-mentioned (A) polyurethane prepolymer is to be obtained, the reaction of the polyol component comprising the above-mentioned (a) polycarbonate polyol, the above-mentioned (b) acidic group-containing polyol compound, and, if necessary, (c) the polyol other than (a) and (b) with the above-mentioned (d) polyisocyanate compound may be carried out by reacting (a), (b) and (c) in an optional order with (d), or may be carried out by mixing two or more kinds and reacting with (d).

When the above-mentioned (a) polycarbonate polyol, the above-mentioned (b) acidic group-containing polyol compound, and, if necessary, the above-mentioned (c) polyol other than (a) and (b) are to be reacted with the above-mentioned (d) polyisocyanate compound, a catalyst may be used.

The above-mentioned catalyst is not particularly limited, and there may be mentioned, for example, tin series catalyst (trimethyltin laurate, dibutyltin dilaurate, etc.), lead series catalyst (lead octate, etc.), etc., a salt of a metal and an organic and inorganic acid, and organic metal derivative, amine series catalyst (triethylamine, N-ethylmorpholine, triethylene diamine, etc.), diazabicycloundecene series catalyst etc. Of these, in view of reactivity, dibutyltin dilaurate is preferably used.

The reaction temperature at the time of reacting the above-mentioned polyol component(s) and the above-mentioned polyisocyanate is not particularly limited, and 40 to 150° C. are preferred. If the reaction temperature is too low, there is a case where the starting material(s) is/are not dissolved, and viscosity of the resulting (A) polyurethane prepolymer is too high whereby the mixture cannot sufficiently be stirred. If the reaction temperature is too high, there is a case where inconvenience occurs that a side reaction occurs, etc. The reaction temperature is further preferably 60 to 120° C.

The reaction of the above-mentioned (a) polycarbonate polyol, the above-mentioned (b) acidic group-containing polyol compound, and, if necessary, the above-mentioned (c) polyol other than (a) and (b), with the above-mentioned (d) polyisocyanate compound may be carried out without solvent or by adding an organic solvent. As the organic solvent, there may be mentioned acetone, methyl ethyl ketone, methyl isobutyl ketone, tetrahydrofuran, dioxane, dimethylformamide, dimethylsulfoxide, N-methylpyrrolidone, N-ethylpyrrolidone, ethyl acetate, etc. Of these, acetone, methyl ethyl ketone and ethyl acetate are preferred since they can be removed by evaporation under reduced pressure and heating after dispersing the polyurethane prepolymer in water and subjecting to chain elongation reaction. Also, N-methylpyrrolidone and N-ethylpyrrolidone are preferred since they act as a film-forming aid when a coating film is prepared from the resulting aqueous polyurethane resin dispersion. An amount of the organic solvent to be added is, in terms of a weight basis, preferably 0.1 to 2.0-fold amount, more preferably 0.15 to 0.7-fold amount based on the total weight of (a) the polycarbonate polyol, (b) the acidic group-containing polyol compound, and, if necessary, the above-mentioned (c) polyol other than (a) and (b).

In the present invention, a content of the carboxylic acid group of (A) the polyurethane prepolymer is 2.0 to 13.0% by weight, preferably 2.0 to 6.0% by weight, and more preferably 2.0 to 4.0% by weight. If the content of a number of the carboxylic acid group is less than 2.0% by weight, dispersibility in an aqueous medium is poor so that an aqueous polyurethane resin dispersion cannot be obtained. Also, if the content of the carboxylic acid group exceeds 13.0% by weight, water resistance of the resulting coating film of the polyurethane resin is lowered.

Incidentally, in the present invention, "the content of the carboxylic acid group of (A) the polyurethane prepolymer" means a content of a carboxylic acid group in the so-called solid component in which, the solvent and the neutralizing agent for dispersing (A) the polyurethane prepolymer in an aqueous medium which are used for preparing the above-mentioned (A) polyurethane prepolymer are excluded.

More specifically, the content of the carboxylic acid (—COOH) group of (A) the polyurethane prepolymer can be calculated from the following equation (3).

[Content of carboxylic acid group of (A) polyurethane prepolymer]=[Molar number of (b) acidic group-containing polyol compound]×45.02/[Total weight of (a) polycarbonate polyol, (b) acidic group-containing polyol compound, and (c) polyol and (d) polyisocyanate compound when they are contained] (3)

((B) Chain-Elongating Agent)

(B) the chain-elongating agent of the present invention has a reactivity with an isocyanate group of (A) the polyurethane prepolymer. As the chain-elongating agent, there may be mentioned, for example, amine compounds such as ethylene diamine, 1,4-tetramethylene diamine, 2-methyl-1,5-pentane diamine, 1,4-butane diamine, 1,6-hexamethylene diamine, 1,4-hexamethylene diamine, 3-aminomethyl-3,5,5-trimethylcyclohexyl amine, 1,3-bis(aminomethyl)cyclohexane, xylylenediamine, piperazine, 2,5-dimethylpiperazine, diethylenetriamine, trimethylenetetramine, etc., diol compounds such as ethylene glycol, propylene glycol, 1,4-butane diol, 1,6-hexane diol, etc., polyalkylene glycols represented by polyethylene glycol, water, etc., and of these, a primary diamine compound is preferred. They may be used one kind alone, or may be used two or more kinds in combination.

An amount of (B) the chain-elongating agent to be added is preferably an equivalent amount or less of the isocyanate group which becomes a start point of chain elongation in the resulting urethane prepolymer, and more preferably 0.7 to 0.99 equivalent of the isocyanate group. When (B) the chain-elongating agent is added in excess of the equivalent amount of the isocyanate group, a molecular weight of the chain-elongated urethane polymer is lowered, and strength of the coating film obtained by coating the resulting aqueous polyurethane resin dispersion is lowered. (B) the chain-elongating agent may be added after dispersing the polyurethane prepolymer in water or may be added during dispersing the same. Chain elongation can be carried out with water. In this case, water as a dispersing medium acts also as a chain-elongating agent.

(Polyurethane Resin)

The polyurethane resin of the present invention can be obtained by reacting the above-mentioned (A) polyurethane prepolymer and the above-mentioned (b) chain-elongating agent. A temperature of the reaction is, for example, 0 to 80° C., and preferably 0 to 60° C.

(Aqueous Medium)

In the present invention, the polyurethane resin is dispersed in an aqueous medium. As the above-mentioned aqueous medium, there may be mentioned water, or a mixed medium of water and hydrophilic organic solvent, etc.

As the above-mentioned water, there may be mentioned, for example, tap water, deionized water, distilled water, ultra pure water, etc. Of these, deionized water is preferably used in view the points that it can be obtained easily and contains no salt since particles become unstable due to the presence of the salt, etc.

As the above-mentioned hydrophilic organic solvent, there may be mentioned a lower monovalent alcohol such as methanol, ethanol, propanol, etc.; a polyvalent alcohol such as ethylene glycol, glycerine, etc.; an aprotic hydrophilic organic solvent such as N-methylmorpholine, dimethylsulfoxide, dimethylformamide, N-methylpyrrolidone, etc.

An amount of the above-mentioned hydrophilic organic solvent in the above-mentioned aqueous medium is preferably 0 to 20% by weight.

(Aqueous Polyurethane Resin Dispersion)

Next, a preparation method of an aqueous polyurethane resin dispersion is explained.

The preparation method of the aqueous polyurethane resin dispersion according to the present invention include Step (α1) of obtaining (A) a polyurethane prepolymer by reacting (a) a polycarbonate polyol having an alicyclic structure in the main chain, (b) an acidic group-containing polyol compound, and (d) a polyisocyanate, or Step (α2) of obtaining (A) a polyurethane prepolymer by reacting (a) a polycarbonate polyol having an alicyclic structure in the main chain, (b) an acidic group-containing polyol compound, (c) a polyol other than (a) and (b) and (d) a polyisocyanate, Step (β) of neutralizing the acidic group of the above-mentioned (A) polyurethane prepolymer, Step (γ) of dispersing the above-mentioned (A) polyurethane prepolymer in an aqueous medium, and Step (δ) of obtaining an aqueous polyurethane resin by reacting the above-mentioned (A) polyurethane prepolymer and (B) the chain-elongating agent having reactivity with the isocyanate group of the above-mentioned (A) polyurethane prepolymer.

Step (α1) or (α2) to obtain (A) the polyurethane prepolymer may be carried out under inert gas atmosphere or under ambient air atmosphere.

Also, as the neutralizing agent which can be used in Step (β) for neutralizing the acidic group of the above-mentioned (A) polyurethane prepolymer, there may be mentioned organic amines such as trimethyl amine, triethyl amine, triisopropyl amine, tributyl amine, triethanol amine, N-methyldiethanol amine, N-phenyl diethanol amine, dimethylethanol amine, diethylethanol amine, N-methyl morpholine, pyridine, etc.; inorganic alkalis such as sodium hydroxide, potassium hydroxide, etc., and ammonia, etc. Of these, organic amines are preferably used, tertiary amine is more preferably used, and triethylamine is most preferably used.

Here, the acidic group of (A) the polyurethane prepolymer means a carboxylic acid group, sulfonic acid group, etc.

In Step (γ) of dispersing the above-mentioned polyurethane prepolymer in an aqueous medium, the method of dispersing the polyurethane prepolymer in an aqueous medium is not particularly limited, and there may be mentioned, for example, a method of adding (A) the polyurethane prepolymer or a solution containing (A) the polyurethane prepolymer into an aqueous medium stirred by a homomixer or homogenizer, etc., and a method of adding an aqueous medium into the polyurethane prepolymer stirred by a homomixer or homogenizer, etc., and the like.

In Step (δ) of obtaining an aqueous polyurethane resin by reacting the above-mentioned (A) polyurethane prepolymer, and (B) a chain-elongating agent having a reactivity with an isocyanate group of the above-mentioned (A) polyurethane prepolymer, the reaction may be carried out slowly under cooling, or may be carried out by accelerating the reaction under heating at 60° C. or lower in some cases. A reaction time under cooling is 0.5 to 24 hours or so, and a reaction time under heating conditions of 60° C. or lower is 0.1 to 6 hours or so.

In the preparation process of the present invention, Step (β) of neutralizing an acidic group of the above-mentioned (A) polyurethane prepolymer, and Step (γ) of dispersing the above-mentioned (A) polyurethane prepolymer in an aqueous medium may be carried out simultaneously, and Step (γ) of dispersing the above-mentioned (A) polyurethane prepolymer in an aqueous medium and Step (δ) of obtaining an aqueous polyurethane resin by reacting with (B) the chain-elongating agent may be carried out simultaneously.

A ratio of the polyurethane resin in the aqueous polyurethane resin dispersion is preferably 5 to 60% by weight, more preferably 20 to 50% by weight.

(Coating Composition)

The coating composition of the present invention is a coating composition containing the above-mentioned aqueous polyurethane resin dispersion.

In the coating composition of the present invention, other resin(s) may be added other than the above-mentioned aqueous polyurethane resin dispersion. As the above-mentioned other resin(s), there may be mentioned a polyester resin, acrylic resin, polyether resin, polycarbonate resin, polyurethane resin, epoxy resin, alkyd resin, etc. They may be used alone, or may be used 2 or more kinds in combination.

Also, the above-mentioned other resin(s) preferably has/have at least one hydrophilic group. As the above-mentioned hydrophilic group, there may be mentioned a hydroxyl group, carboxylic acid group, sulfonic acid group, etc.

The above-mentioned other resin(s) is/are preferably at least one selected from the group consisting of a polyester resin and acrylic resin.

Also, when the above-mentioned polyester resin and the above-mentioned acrylic resin have a hydroxyl group(s), the so-called urethane-modified polyester resin or urethane-modified acrylic resin in which a part or whole of the hydroxyl groups in the resin and the polyisocyanate compound are subjected to urethanization reaction to elongate these resins to be high molecular weighted may be used in combination.

The above-mentioned polyester resin can be generally prepared by esterification reaction or transesterification reaction of an acid component and an alcohol component.

As the above-mentioned acid component, a compound generally used as an acid component for the preparation of a polyester resin can be used. As the acid component, there may be used, for example, an aliphatic polybasic acid, alicyclic polybasic acid, aromatic polybasic acid, etc.

A hydroxyl value of the above-mentioned polyester resin is preferably 10 to 300 mg KOH/g or so, more preferably 50 to 250 mg KOH/g or so, and further preferably 80 to 180 mg KOH/g or so. An acid value of the above-mentioned polyester resin is preferably 1 to 200 mg KOH/g or so, more preferably 15 to 100 mg KOH/g or so, and further preferably 25 to 60 mg KOH/g or so.

A weight average molecular weight of the above-mentioned polyester resin is preferably 500 to 50,000, more preferably 1,000 to 30,000, and further preferably 1,500 to 20,000.

As the above-mentioned acrylic resin, a hydroxyl group-containing acrylic resin is preferred. The above-mentioned hydroxyl group-containing acrylic resin can be prepared by copolymerizing the hydroxyl group-containing polymerizable unsaturated monomer and other polymerizable unsaturated monomer which is copolymerizable with said hydroxyl group-containing polymerizable unsaturated monomer by the known methods, for example, a solution polymerization method in an organic solvent, an emulsion polymerization method in water, and the like.

The above-mentioned hydroxyl group-containing polymerizable unsaturated monomer is a compound having a hydroxyl group and a polymerizable unsaturated bond each one or more in one molecule. There may be mentioned, for example, a mono-esterified product of a (meth)acrylic acid such as 2-hydroxyethyl (meth)acrylate, 2-hydroxypropyl (meth)acrylate, 3-hydroxypropyl (meth)acrylate, 4-hydroxybutyl (meth)acrylate, etc., and a divalent alcohol having a carbon number of 2 to 8; an ε-caprolactone-modified product of these mono esterified products; N-hydroxymethyl (meth) acrylamide; allyl alcohol; (meth)acrylate having a polyoxyethylene chain the molecular end of which is a hydroxyl group, etc.

The above-mentioned hydroxyl group-containing acrylic resin preferably has a cationic functional group.

With regard to the hydroxyl group-containing acrylic resin having a cationic functional group, it can be prepared by, for example, using a polymerizable unsaturated monomer having a cationic functional group such as a tertiary amino group, quaternary ammonium base, etc., as a kind of the above-mentioned polymerizable unsaturated monomer.

A hydroxyl value of the above-mentioned hydroxyl group-containing acrylic resin is preferably 1 to 200 mg KOH/g or so in view of storage stability or water resistance of the resulting coating film, etc., more preferably 2 to 100 mg KOH/g or so, and further preferably 3 to 60 mg KOH/g or so.

Also, when the hydroxyl group-containing acrylic resin has an acidic group such as a carboxyl group, etc., an acid value of said hydroxyl group-containing acrylic resin is preferably 1 to 200 mg KOH/g or so in view of water resistance, etc., of the resulting coating film, more preferably 2 to 150 mg KOH/g or so, and further preferably 5 to 100 mg KOH/g or so.

A weight average molecular weight of the above-mentioned hydroxyl group-containing acrylic resin is preferably 1,000 to 200,000, more preferably 2,000 to 100,000, and further it is suitable in the range of preferably 3,000 to 50,000.

As the above-mentioned polyether resin, there may be mentioned a polymer or copolymer having an ether bond, and, specifically mentioned, for example, a polyoxyethylene series polyether, a polyoxypropylene series polyether, a polyoxybutylene series polyether, a polyether derived from an aromatic polyhydroxy compound such as bisphenol A, bisphenol F, etc.

As the above-mentioned polycarbonate resin, there may be mentioned a polymer prepared by a bisphenol compound, and, for example, bisphenol A polycarbonate, etc., may be mentioned.

As the above-mentioned polyurethane resin, there may be mentioned a resin having an urethane bond which is obtained by the reaction of various kinds of polyol components such as acrylic, polyester, polyether, polycarbonate, etc., and a polyisocyanate compound.

As the above-mentioned epoxy resin, there may be mentioned a resin obtained by the reaction of a bisphenol compound and epichlorohydrin, etc. As the bisphenol, there may be mentioned, for example, bisphenol A, bisphenol F.

As the above-mentioned alkyd resin, there may be mentioned an alkyd resin obtained by reacting a polybasic acid such as phthalic acid, terephthalic acid, succinic acid, etc., and a polyvalent alcohol, and further with a modifying agent such as oil and fats, oil and fats aliphatic acid (soybean oil, linseed oil, palm oil, stearic acid, etc.), a natural resin (rosin, amber, etc.), etc.

When a curing agent is added to the coating composition of the present invention, water resistance, etc., of the coating film or plural-layered coating film prepared by using the above-mentioned coating composition can be improved.

As the above-mentioned curing agent, there may be used, for example, an amino resin, polyisocyanate compound, blocked polyisocyanate compound, melamine resin, carbodiimide, etc. The above-mentioned curing agent may be used singly, or may be used a plural number thereof in combination.

As the above-mentioned amino resin, there may be mentioned, for example, a partially or completely methylolated amino resin obtained by the reaction of an amino component and an aldehyde component. As the above-mentioned amino component, there may be mentioned, for example, melamine, urea, benzoguanamine, acetoguanamine, steroguanamine, spiroguanamine, dicyane diamide, etc. As the aldehyde component, there may be mentioned, for example, formaldehyde, paraformaldehyde, acetaldehyde, benzaldehyde, etc.

As the above-mentioned polyisocyanate compound, there may be mentioned, for example, a compound having 2 or more isocyanate groups in one molecule, and there may be exemplified by, for example, hexamethylene diisocyanate, trimethyl hexamethylene diisocyanate, etc.

As the above-mentioned blocked polyisocyanate compound, there may be mentioned those obtained by adding a blocking agent to the polyisocyanate group of the above-mentioned polyisocyanate compound, and as the blocking agent, there may be mentioned a blocking agent including a phenol series material such as phenol, cresol, etc., and an aliphatic alcohol series material such as methanol, ethanol, etc.

As the above-mentioned melamine resin, there may be mentioned, for example, methylolmelamine such as dimethylolmelamine, trimethylolmelamine etc.; an alkyl etherified product or condensate of these methylolmelamines; a condensate of the alkyl etherified product of methylolmelamine, etc.

To the coating composition of the present invention, a colored pigment, an extender pigment, or a photoluminescent pigment may be added.

As the above-mentioned colored pigment, there may be mentioned, for example, titanium oxide, zinc white, carbon black, molybdenum red, Prussian blue, cobalt blue, azo pigment, phthalocyanine pigment, quinacridone pigment, isoindoline pigment, styrene series pigment, perylene pigment etc. They may be used singly or two more kinds in combination. In particular, it is preferred to use titanium oxide and/or carbon black as a colored pigment.

As the above-mentioned extender pigment, there may be mentioned, for example, clay, kaolin, barium sulfate, barium carbonate, calcium carbonate, talc, silica, alumina white, etc. They may be used singly or two more kinds in combination: In particular, it is preferred to use barium sulfate and/or talc as an extender pigment, and it is more preferred to use barium sulfate.

As the above-mentioned light reflecting pigment, there may be used, for example, aluminum, copper, zinc, brass, nickel, aluminum oxide, mica, aluminum oxide coated by titanium oxide or iron oxide, mica coated by titanium oxide or iron oxide, etc.

In the coating composition of the present invention, a usual additive for paint such as a thickening agent, curing catalyst, UV absorber, photo stabilizer, defoaming agent, plasticizer, surface adjuster, anti-sediment agent, etc., may be contained singly or in combination of two or more kinds, if necessary.

A preparation method of the coating composition of the present invention is not particularly limited, and a conventionally known preparation method may be employed. In general, the coating composition can be prepared by mixing the above-mentioned aqueous polyurethane resin dispersion with the above-mentioned various kinds of additives, adding an aqueous medium, and regulating a viscosity suitable for the coating method.

As a material to be coated by the coating composition, a metal, plastic, inorganic material, etc., may be mentioned.

As a coating method of the coating composition, there may be mentioned a bell coating, spray coating, roll coating, shower coating, dip coating, etc.

In the following, the present invention will be specifically explained by referring to Examples, but the scope of the present invention is not limited by these.

EXAMPLE 1

Preparation of (a) Polycarbonate Polyol having Alicyclic Structure in the Main Chain In a reactor equipped with a stirrer, a thermometer and a fractionating column were charged 271.6 parts by weight of 1,6-hexane diol, 893.2 parts by weight of 1,4-cyclohexane dimethanol, 847.0 parts by weight of dimethyl carbonate and 0.15 part by weight of tetra-n-butoxy titanium, and the mixture was reacted at 95 to 160° C. while subjecting methanol and dimethyl carbonate which were by-produced to azeotropic distillation. After substantially ceasing distillation of methanol, the mixture was reduced to 10 mmHg or less and further reacted for 4 hours. Incidentally, the reaction was carried out under nitrogen atmosphere. After completion of the reaction, the reaction mixture was cooled to obtain a colorless transparent liquid at room temperature having a hydroxyl value of 124.7 (a number average molecular weight of 900).

(Preparation of Aqueous Polyurethane Resin Dispersion)

In a reaction device equipped with a stirrer and a heater were charged 518.0 parts by weight of (a) the polycarbonate polyol having an alicyclic structure in the main chain prepared as mentioned above, 77.5 parts by weight of 2,2-dimethylolpropionic acid and 469.8 parts by weight of NMP (N-methyl-2-pyrrolidone) while introducing nitrogen. Thereafter, the mixture was heated to 60° C., and dimethylolpropionic acid was confirmed to be dissolved. To the mixture were added 498.8 parts by weight of 4,4'-dicyclohexyl methane diisocyanate (hydrogen-added MDI) and 0.4 parts by weight of dibutyltin dilaurate as a catalyst, the mixture was heated to 90° C., and urethanization reaction was carried out over 5 hours to prepare a polyurethane prepolymer (a carboxylic acid group content in the polyurethane prepolymer was 2.38% by weight, and a number of a hydroxyl equivalent of the polyol component was 258). The NCO group content at the time of completion of the urethanization reaction was 4.00% by weight. The reaction mixture was cooled to 80° C., 58.0 parts by weight of triethylamine was added thereto and mixed, and the resulting mixture was added into 2452.3 parts by weight of water while vigorously stirring. Then, 217.3 parts by weight of 35% by weight 2-methyl-1,5-pentanediamine aqueous solution was added to the mixture and chain elongation reaction was carried out to obtain an aqueous polyurethane resin dispersion.

EXAMPLE 2

Preparation of Aqueous Polyurethane Resin Dispersion

In a reaction device equipped with a stirrer and a heater were charged 180.8 parts by weight of (a) the polycarbonate polyol having an alicyclic structure in the main chain prepared in Example 1, 36.4 parts by weight of 2,2-dimethylolpropionic acid, 6.4 parts by weight of 1,4-butane diol and 195.0 parts by weight of NMP (N-methyl-2-pyrrolidone) while introducing nitrogen. Thereafter, the mixture was heated to 60° C. to confirm that dimethylolpropionic acid was dissolved therein. Further, 244.0 parts by weight of hydrogen-added MDI, and 0.4 part by weight of dibutyltin dilaurate as a catalyst were added to the mixture, and the resulting mixture was heated to 90° C. to carry out urethanization reaction over 5 hours to prepare a polyurethane prepolymer (the carboxylic acid group content in the polyurethane prepolymer was 2.61% by weight and the number of the hydroxyl equivalent of the polyol component was 206). The NCO group content at the time of completion of the urethanization reaction was 4.96% by weight. The reaction mixture was cooled to 80° C., 27.4 parts by weight of triethylamine was added thereto and mixed, and the resulting mixture was added into 1110.0 parts by weight of water while vigorously stirring. Then, 122.0 parts by weight of 35% by weight 2-methyl-1,5-pentanediamine aqueous solution was added to the mixture to carry out chain elongation reaction to obtain an aqueous polyurethane resin dispersion.

EXAMPLE 3

Preparation of Aqueous Polyurethane Resin Dispersion

In a reaction device equipped with a stirrer and a heater were charged 180.0 parts by weight of (a) the polycarbonate polyol having an alicyclic structure in the main chain prepared in Example 1, 48.1 parts by weight of 2,2-dimethylolpropionic acid, 8.9 parts by weight of 1,4-butane diol and 223.8 parts by weight of NMP (N-methyl-2-pyrrolidone) while introducing nitrogen. Thereafter, the mixture was heated to 60° C., and dissolution of dimethylolpropionic acid was confirmed. Moreover, 296.3 parts by weight of hydrogen-added MDI, and 0.4 parts by weight of dibutyltin dilaurate as a catalyst were added to the mixture and the mixture was heated to 90° C. to carry out urethanization reaction for 5 hours to prepare a polyurethane prepolymer (the carboxylic acid group content in the polyurethane prepolymer was 3.03% by weight and the number of the hydroxyl equivalent of the polyol component was 180). The NCO group content at the time of completion of the urethanization reaction was 5.20% by weight. The reaction mixture was cooled to 80° C., 36.1 parts by weight of triethylamine was added thereto and mixed, and the resulting mixture was added into 1245.4 parts by weight of water while vigorously stirring. Then, 134.4 parts by weight of 35% by weight 2-methyl-1,5-pentanediamine aqueous solution was added thereto to carry out chain elongation reaction to obtain an aqueous polyurethane resin dispersion.

EXAMPLE 4

Preparation of Aqueous Polyurethane Resin Dispersion

In a reaction device equipped with a stirrer and a heater were charged 180.0 parts by weight of (a) the polycarbonate polyol having an alicyclic structure in the main chain prepared in Example 1, 60.0 parts by weight of 2,2-dimethylolpropionic acid, 8.9 parts by weight of 1,4-butane diol and 223.8 parts by weight of NMP (N-methyl-2-pyrrolidone) while introducing nitrogen. Thereafter, the mixture was heated to 60° C., and dissolution of dimethylolpropionic acid was confirmed. Moreover, 310.1 parts by weight of hydrogen-added MDI, and 0.4 parts by weight of dibutyltin dilaurate as a catalyst were added to the mixture and the mixture was heated to 90° C. to carry out urethanization reaction for 5 hours to prepare a polyurethane prepolymer (the carboxylic acid group content in the polyurethane prepolymer was 3.60% by weight and the number of the hydroxyl equivalent of the polyol component was 166). The NCO group content at the time of completion of the urethanization reaction was 4.70% by weight. The reaction mixture was cooled to 80° C., 45.2 parts by weight of triethylamine was added thereto and mixed, and the resulting mixture was added into 1245.4 parts by weight of water while vigorously stirring. Then, 144.6 parts by weight of 35% by weight 2-methyl-1,5-pentane diamine aqueous solution was added thereto to carry out chain elongation reaction to obtain an aqueous polyurethane resin dispersion.

COMPARATIVE EXAMPLE 1

Preparation of Aqueous Polyurethane Resin Dispersion

In a reaction device equipped with a stirrer and a heater were charged 180.0 parts by weight of (a) the polycarbonate polyol having an alicyclic structure in the main chain prepared in Example 1, 26.8 parts by weight of 2,2-dimethylolpropionic acid, 10.8 parts by weight of 1,4-butane diol and 198.5 parts by weight of NMP (N-methyl-2-pyrrolidone) while introducing nitrogen. Thereafter, the mixture was heated to 60° C., and dissolution of dimethylolpropionic acid was confirmed. Moreover, 245.6 parts by weight of hydrogen-added MDI, and 0.4 parts by weight of dibutyltin dilaurate as a catalyst were added to the mixture and the mixture was heated to 90° C. to carry out urethanization reaction for 5 hours to prepare a polyurethane prepolymer (the carboxylic acid group content in the polyurethane prepolymer was 1.94% by weight and the number of the hydroxyl equivalent of the polyol component was 209). The NCO group content at the time of completion of the urethanization reaction was 5.30% by weight. The reaction mixture was cooled to 80° C., 20.2 parts by weight of triethylamine was added thereto and mixed, and when the resulting mixture was added into 1544.0 parts by weight of water while vigorously stirring, then, dispersion of the polyurethane prepolymer in water was not confirmed, and a lump of the polyurethane prepolymer was precipitated and stayed at the bottom portion of the stirring tank. Stirring was further continuously carried out, but dispersion was not admitted to be formed.

COMPARATIVE EXAMPLE 2

Preparation of Aqueous Polyurethane Resin Dispersion

In a reaction device equipped with a stirrer and a heater were charged 247.0 parts by weight of (a) the polycarbonate polyol having an alicyclic structure in the main chain prepared in Example 1, 24.0 parts by weight of 2,2-dimethylolpropionic acid, 6.0 parts by weight of 1,4-butane diol and 110.0 parts by weight of NMP (N-methyl-2-pyrrolidone) while introducing nitrogen. Thereafter, the mixture was heated to 60° C., and dissolution of dimethylolpropionic acid was confirmed. Moreover, 140.0 parts by weight of IPDI (isophorone diisocyanate) was added to the mixture and the mixture was heated to 75 to 83° C. to carry out urethanization reaction for 5 hours to prepare a polyurethane prepolymer (the carboxylic acid group content in the polyurethane prepolymer was 1.93% by weight and the number of the hydroxyl equivalent of the polyol component was 266). The NCO group content at the time of completion of the urethanization reaction was 1.80% by weight. The reaction mixture was cooled to 80° C., 18.0 parts by weight of triethylamine was added thereto and mixed, and when an aqueous solution in which 5.0 parts by weight of diethylenetriamine had been dissolved in 680.0 parts by weight of water was added to the resulting mixture while vigorously stirring, then, dispersion of the prepolymer in water was not confirmed, and gellation proceeded so that an aqueous dispersion could not be obtained.

COMPARATIVE EXAMPLE 3

Preparation of Aqueous Polyurethane Resin Dispersion

In a reaction device equipped with a stirrer and a heater were charged 80.3 parts by weight of "ETERNACOLL UH-100" (manufactured by UBE INDUSTRIES, LTD., polycarbonate diol prepared by using 1,6-hexane diol and dimethyl carbonate as starting materials, and having a number average molecular weight of 1000) having a hydroxyl value of 112.2, 12.1 parts by weight of 2,2-dimethylolpropionic acid, 1.0 parts by weight of 1,4-butane diol and 73.8 parts by weight of NMP (N-methyl-2-pyrrolidone) while introducing nitrogen. Thereafter, the mixture was heated to 60° C., and dissolution of dimethylolpropionic acid was confirmed. Moreover, 80.8 parts by weight of hydrogen-added MDI, and 0.2 parts by weight of dibutyltin dilaurate as a catalyst were added to the mixture and the mixture was heated to 90° C. to carry out urethanization reaction for 6 hours to prepare a polyurethane prepolymer (the carboxylic acid group content in the polyurethane prepolymer was 2.33% by weight and the number of the hydroxyl equivalent of the polyol component was 257). The NCO group content at the time of completion of the urethanization reaction was 4.30% by weight. The reaction mixture was cooled to 80° C., 9.1 parts by weight of triethylamine was added thereto and mixed, and the resulting mixture was added into 384.8 parts by weight of water while vigorously stirring. Moreover, 38.5 parts by weight of 35% by weight 2-methyl-1,5-pentanediamine aqueous solution was added to the mixture to carry out chain elongation reaction to obtain an aqueous polyurethane resin dispersion.

COMPARATIVE EXAMPLE 4

Preparation of Aqueous Polyurethane Resin Dispersion

In a reaction device equipped with a stirrer and a heater were charged 80.1 parts by weight of "ETERNACOLL UM-90 (1/3)" (manufactured by UBE INDUSTRIES, LTD., polycarbonate diol having a number average molecular weight of 900, prepared from 1,6-hexane diol, 1,4-cyclohexane dimethanol and dimethyl carbonate as starting materials) having a hydroxyl value of 124.7, 9.7 parts by weight of 2,2-dimethylolpropionic acid and 68.9 parts by weight of NMP (N-methyl-2-pyrrolidone), while introducing a nitrogen thereinto. Thereafter, the mixture was heated to 60° C., and dissolution of dimethylolpropionic acid was confirmed. Moreover, 70.9 parts by weight of hydrogen-added MDI and 0.2 part by weight of dibutyltin dilaurate as a catalyst were added to the mixture, and the resulting mixture was heated to 90° C., to carry out urethanization reaction for 6 hours to prepare a polyurethane prepolymer (the carboxylic acid group content in the polyurethane prepolymer was 2.02% by weight and the umber of the hydroxyl equivalent of the polyol component was 278). The NCO group content at the time of completion of the urethanization reaction was 4.00% by weight. The reaction mixture was cooled to 80° C., 7.2 parts by weight of triethylamine was added to the mixture and stirred, and the resulting mixture was added into 338.8 parts by weight of water while vigorously stirring. Moreover, 30.7 parts by weight of 35% by weight 2-methyl-1,5-pentane diamine aqueous solution was added to the mixture to carry out chain elongation reaction whereby an aqueous polyurethane resin dispersion was obtained.

(Evaluation of Dispersibility)

With regard to the above-mentioned Examples 1 to 3 and Comparative examples 1 to 4, dispersibility of the polyurethane resin in an aqueous medium was evaluated. Evaluation methods and evaluation standards are as follows.

○: Good dispersion could be obtained.
Δ: Partial dispersion failure was observed.
X: Never dispersed.

(Evaluation of Hardness)

With regard to the above-mentioned Examples 1 to 3 and Comparative examples 3 and 4, evaluation of hardness was carried out by measurements of the following mentioned pencil hardness and elasticity. Incidentally, Comparative example 1 and Comparative example 2 did not give any aqueous polyurethane resin dispersion, so that preparation of a sample could not be carried out whereby measurements of the following mentioned pencil hardness and elasticity could not be carried out.

1) Pencil Hardness Test

[Preparation of Sample]

Each aqueous polyurethane resin dispersion of the above-mentioned Examples 1 to 3 and Comparative examples 3 and 4 was uniformly coated on a glass plate with a thickness of about 0.4 mm. Then, it was allowed to stand at room temperature for 16 hours, and dried at 120° C. for 3 hours, and further at 140° C. for 2 hours.

[Measurement of Pencil Hardness]

In a laminated material of the glass plate and the polyurethane resin coating film obtained as mentioned above, pencil hardness of the above-mentioned polyurethane resin coating film was measured according to the method described in JIS K 5600-5-4 with regard to the above-mentioned Examples 1 to 3, and Comparative examples 3 and 4.

2) Measurement of Elasticity

[Preparation of Sample]

Each aqueous polyurethane resin dispersion of the above-mentioned Examples 1 to 3 and Comparative examples 3 and 4 was uniformly coated onto a glass plate with a thickness of about 0.4 mm. Then, each was allowed to stand at room temperature for 16 hours, dried at 120° C. for 3 hours and further at 140° C. for 2 hours, and the resultant respective polyurethane resin films were peeled off from the glass plate to apply to the following evaluations.

[Measurement of Elasticity]

Elasticities of the above-mentioned polyurethane films were measured by a method according to JIS K 7113.

TABLE 1

|  | Example 1 | Example 2 | Example 3 | Example 4 | Comparative example 1 | Comparative example 2 | Comparative example 3 | Comparative example 4 |
|---|---|---|---|---|---|---|---|---|
| Presence of (a) | Present | Present | Present | Present | Present | Present | Absent | Present |
| Carboxyl acid group content | 2.38 | 2.61 | 3.03 | 3.60 | 1.94 | 1.93 | 2.33 | 2.02 |
| Hydroxyl equivalent | 258 | 206 | 180 | 166 | 209 | 266 | 257 | 278 |
| Dispersibility | ○ | ○ | ○ | ○ | X | X | ○ | ○ |
| Pencil hardness | B | B | HB | HB | — | — | 4B | 4B |
| Elasticity (MPa) | 725 | 661 | 632 | 482 | — | — | 361 | 396 |

EXAMPLE 5

Preparation of Coating Composition

In a paint shaker were dispersed 280 g of an aqueous dispersible polyester polyol ("SETAL 6306" manufactured by Nuplex Co., resin component concentration: 60% by weight, hydroxyl group value: 89 mg KOH/g of resin, acid value: 42 mg KOH/g of resin) neutralized by dimethyl ethanol amine so that a molar ratio of carboxylic acid/amine becomes 1.0, 600 g of rutile type titanium dioxide, 15 g of barium sulfate and 280 g of deionized water for 30 minutes to prepare a pigment-dispersed paste.

To the obtained pigment-dispersed paste were added 430 g of the aqueous polyurethane resin dispersion obtained in Example 1, 115 g of an aqueous dispersible polyester polyol ("SETAL 6306" manufactured by Nuplex Co.) neutralized by dimethylethanolamine so that a molar ratio of carboxylic acid/amine becomes 1.0, 115 g of deionized water, 330 g of acrylic polyol ("Setalux 1767VV-65" manufactured by Aczo Nobel, number average molecular weight=2500, hydroxyl group value=150 mg KOH/g (based on the resin component), Tg=9.0° C.) and 330 g of methyl-butyl mixed etherified melamine resin ("U-VAN 2028" manufactured by Mitsui Chemicals, Inc.), and the components were uniformly dispersed to obtain a coating composition.

The obtained coating composition was coated onto an electrodeposited steel plate with a thickness of 25 μm, and heated at 140° C. for 30 minutes, then, a good coating film improved in elasticity and excellent in hardness could be obtained.

UTILIZABILITY IN INDUSTRY

The aqueous polyurethane resin dispersion of present invention can be widely utilized as a starting material, etc., for a paint or a coating agent.

The invention claimed is:
1. An aqueous polyurethane resin dispersion which comprises
a polyurethane resin which is obtained by reacting (A) a polyurethane prepolymer obtained by reacting (a) a polycarbonate polyol having an alicyclic structure in the main chain, (b) an acidic group-containing polyol compound and (d) a polyisocyanate, and (B) a chain-elongating agent, being dispersed in an aqueous medium, a carboxylic acid group content of (A) the polyurethane prepolymer based on a solid component of (A) the polyurethane prepolymer is 2.0 to 13.0% by weight, and the number of the hydroxyl equivalent of the mixture of (a) the polycarbonate polyol having an alicyclic structure in the main chain and (b) the acidic group-containing polyol compound is 70 to 270.

2. The aqueous polyurethane resin dispersion according to claim 1, wherein (a) the polycarbonate polyol having an alicyclic structure in the main chain is a material having an alicyclic hydrocarbon group with a carbon number of 5 to 12.

3. The aqueous polyurethane resin dispersion according to claim 1, wherein an amount of (a) the polycarbonate polyol having an alicyclic structure in the main chain is 60 to 95 parts by weight and an amount of (b) the acidic group-containing polyol compound is 5 to 40 parts by weight based on the sum of (a) and (b) being 100 parts by weight.

4. The aqueous polyurethane resin dispersion according to claim 1, wherein a content of the carboxylic acid group of (A) the polyurethane prepolymer based on the solid content of (A) the polyurethane prepolymer is 2.0 to 4.0% by weight.

5. The aqueous polyurethane resin dispersion according to claim 1, wherein a hydroxyl equivalent of the mixture of (a) the polycarbonate polyol having an alicyclic structure in the main chain and (b) the acidic group-containing polyol compound is 160 to 260.

6. An aqueous polyurethane resin dispersion which comprises a polyurethane resin which is obtained by reacting (A) a polyurethane prepolymer obtained by reacting (a) a polycarbonate polyol having an alicyclic structure in the main chain, (b) an acidic group-containing polyol compound, (c) a polyol other than (a) and (b), and (d) a polyisocyanate, and (B) a chain-elongating agent, being dispersed in an aqueous medium, a carboxylic acid group content of (A) the polyurethane prepolymer is 2.0 to 13.0% by weight based on the solid content of (A) the polyurethane prepolymer, and the number of the hydroxyl equivalent of the mixture of (a) the polycarbonate polyol having an alicyclic structure in the main chain, (b) the acidic group-containing polyol compound and (c) the polyo other than (a) and (b) is 70 to 270.

7. The aqueous polyurethane resin dispersion according to claim 6, wherein (a) the polycarbonate polyol having an alicyclic structure in the main chain is a material having an alicyclic hydrocarbon group with a carbon number of 5 to 12 in the main chain.

8. The aqueous polyurethane resin dispersion according to claim 6, wherein an amount of (a) the polycarbonate polyol having an alicyclic structure in the main chain is 60 to 95 parts by weight, an amount of (b) the acidic group-containing polyol compound is 5 to 40 parts by weight, and an amount of (c) the polyol other than (a) and (b) is 0 to 30 parts by weight based on the sum of (a), (b) and (c) as 100 parts by weight.

9. The aqueous polyurethane resin dispersion according to claim 6, wherein a content of the carboxylic acid group of (A) the polyurethane prepolymer based on the solid content of (A) the polyurethane prepolymer is 2.0 to 4.0% by weight.

10. The aqueous polyurethane resin dispersion according to claim 6, wherein the number of a hydroxyl equivalent of the mixture of (a) the polycarbonate polyol having an alicyclic structure in the main chain, the above-mentioned (b) acidic group-containing polyol compound and the above-mentioned (c) polyol other than (a) and (b) is 160 to 260.

11. A coating composition containing the aqueous polyurethane resin dispersion according to claim 1.

12. A coating composition containing the aqueous polyurethane resin dispersion according to claim 6.

13. A process for preparing the aqueous polyurethane resin dispersion according to claim 1, which comprises the steps of:

Step ($\alpha$1) of obtaining (A) a polyurethane prepolymer by reacting (a) a polycarbonate polyol having an alicyclic structure in the main chain, (b) an acidic group-containing polyol compound and (d) a polyisocyanate, Step ($\beta$) of neutralizing an acidic group of the above-mentioned (A) polyurethane prepolymer, Step ($\gamma$) of dispersing the above-mentioned (A) polyurethane prepolymer into an aqueous medium, and Step ($\delta$) of obtaining a polyurethane resin by reacting the above-mentioned (A) polyurethane prepolymer and (B) a chain-elongating agent having a reactivity with an isocyanate group of the above-mentioned (A) polyurethane prepolymer.

14. A process for preparing the aqueous polyurethane resin dispersion according to claim 6, which comprises the steps of:

Step ($\alpha$2) of obtaining (A) a polyurethane prepolymer by reacting (a) a polycarbonate polyol having an alicyclic structure in the main chain, (b) an acidic group-containing polyol compound, (c) a polyol other than (a) and (b), and (d) a polyisocyanate, Step ($\beta$) of neutralizing an acidic group of the above-mentioned (A) polyurethane prepolymer, Step ($\gamma$) of dispersing the above-mentioned (A) polyurethane prepolymer into an aqueous medium, and Step ($\delta$) of obtaining a polyurethane resin by reacting the above-mentioned (A) polyurethane prepolymer and (B) a chain-elongating agent having a reactivity with an isocyanate group of the above-mentioned (A) polyurethane prepolymer.

\* \* \* \* \*